H. A. S. HOWARTH.
THRUST BEARING.
APPLICATION FILED NOV. 14, 1917.
1,342,384.
Patented June 1, 1920.
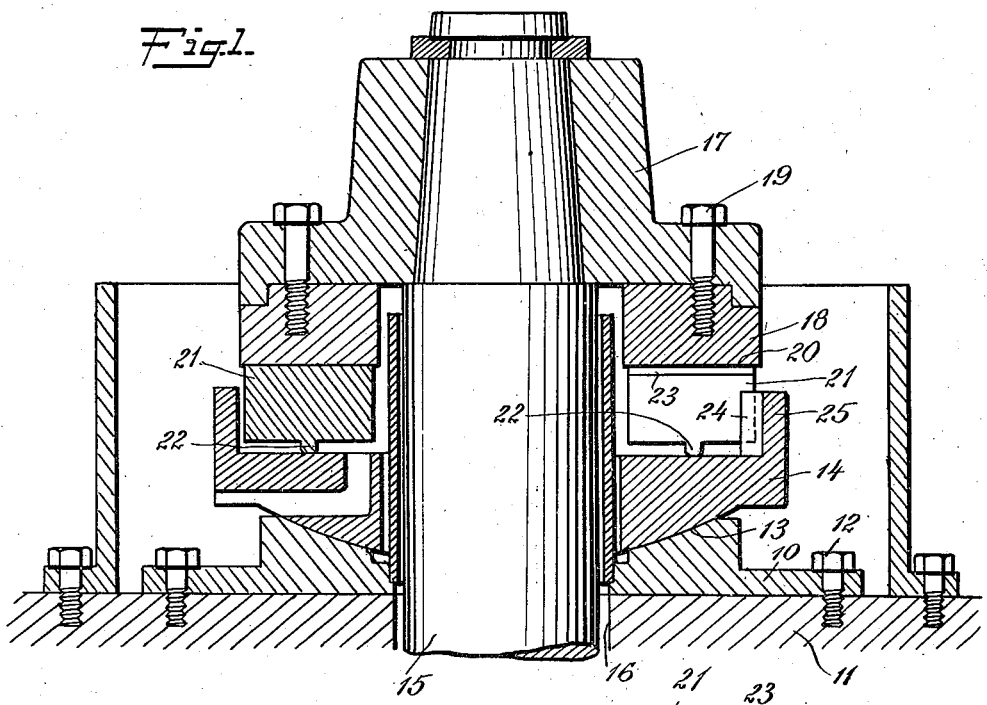
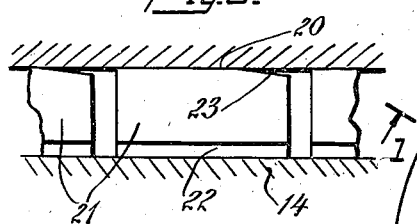
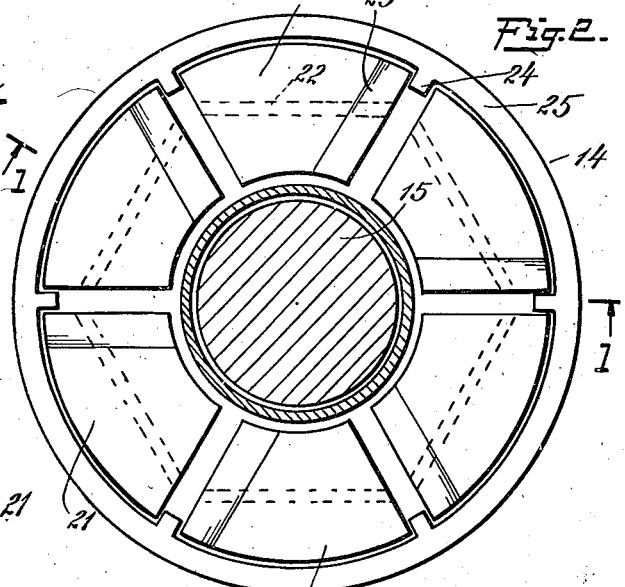
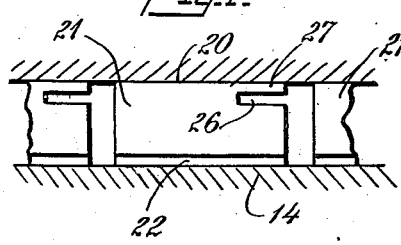
Inventor
Harry A. S. Howarth
By his Attorneys
Marshall & Dearborn

UNITED STATES PATENT OFFICE.

HARRY A. S. HOWARTH, OF PITTSBURGH, PENNSYLVANIA, ASSIGNOR TO ALBERT KINGSBURY, OF PITTSBURGH, PENNSYLVANIA.

THRUST-BEARING.

1,342,384.      Specification of Letters Patent.      Patented June 1, 1920.

Application filed November 14, 1917. Serial No. 201,914.

*To all whom it may concern:*

Be it known that I, HARRY A. S. HOWARTH, a citizen of the United States of America, and a resident of Pittsburgh, Allegheny county, and State of Pennsylvania, have invented certain new and useful Improvements in Thrust-Bearings, of which the following is a specification, reference being had to the accompanying drawings, forming a part thereof.

My invention relates to thrust bearings and it has for one object to provide a bearing of this character having a plurality of shoes or thrust members which are adapted to tilt radially but which do not depend upon circumferential tilting of the shoe to establish automatic lubrication.

Another object is to provide a bearing of the shoe type wherein each has a knife edge support adapted to prevent the circumferential bending of the shoe under the operating pressures, and which is nevertheless constructed to establish automatically a lubricating film between the bearing surfaces when the bearing is in operation.

In order that my invention may be thoroughly understood I will now proceed to describe the same in the following specification and then point out the novel features thereof in appended claims. The invention is capable of receiving a variety of mechanical expressions, two of which are shown on the accompanying drawings, but it is to be expressly understood that the drawings are for purposes of illustration only and are not to be construed as a definition of the limits of the invention, reference being had to the appended claims for that purpose.

Referring to the drawings:

Figure 1 is a sectional elevation of a thrust bearing arranged and constructed in accordance with my invention, the section being taken on the line 1—1 of Fig. 2.

Fig. 2 is a sectional plan view of the same bearing.

Fig. 3 is a sectional detail showing the construction for establishing the oil film between the bearing surfaces.

Fig. 4 is a modified structure which embodies my invention but employs a slightly different construction for establishing the automatic oil film.

Having special reference to Figs. 1, 2 and 3, the form shown comprises a base ring 10 which is secured to a bed plate or foundation 11 by bolts 12 and has a spherically curved surface 13 on which a leveling washer 14 is mounted. The thrust shaft 15 extends through a suitable opening 16 in the foundation as well as through the rings 10 and 14 and has affixed thereto near its upper end a thrust block 17.

A thrust collar 18 is suitably secured to the thrust block as by bolts 19 and has a bearing surface 20 with which a plurality of bearing shoes 21 coöperate. The bearing shoes, as clearly shown in Fig. 2, have the form of ring segments and in the form shown each of them is provided with a chordal rib 22 extending longitudinally of the same and which constitutes a knife edge support resting upon the leveling washer 14. Said ribs, however, might be provided on the leveling ring and engage the rear face of the shoe without departing from the spirit of my invention. The rib, also, need not be continuous throughout its length, but may be interrupted.

In the form shown in Figs. 1, 2 and 3, the top surface of each shoe has a beveled face at its advancing edge, *i. e.* that edge toward which the collar 18 rotates, as indicated at 23, which serves to wedge the lubricating fluid between the bearing surfaces when the bearing is in operation. If the bearing is to operate continuously in one direction, only one of the edges of the shoe needs to be beveled but if the bearing is to operate in either direction both edges should be beveled.

The shoes are suitably prevented from revolving with the thrust collar as by radial lugs 24 which extend inwardly between the shoes from a flange 25 on the leveling washer.

The ribs or knife edge supports 22 are preferably at right angles to the central radial planes of the shoes and, while they permit the shoes to tilt radially so as to seat themselves on the bearing surface of the thrust collar 18 even though this surface may be distorted or out of true due to the heating of the structure in operation, or for any other cause, they do not permit the tilting of the shoes in a circumferential direction. The knife edge support has the advantage of stiffening the shoe and preventing its being improperly bent or crowned circumferentially due to the wedging action of the oil when the bearing is in operation.

Lubrication of the bearing surfaces is automatically provided for independently of the mounting of the shoes, each shoe being so constructed as to automatically establish by wedging action an oil film between its own and the coöperating bearing surface. The means for thus establishing automatic lubrication may be of any suitable nature.

In the arrangement of Figs. 1, 2 and 3, provision is made for automatic lubrication by beveling each shoe at 23. In the form shown in Fig. 4 the automatic lubrication is effected by providing a slot 26 in each shoe near the leading edge so as to enable the relatively thin portion 27 of the shoe to yield and permit the oil to enter.

The particular construction shown in Fig. 4 is not specifically claimed herein but is covered by my copending application Serial No. 201,915 filed of even date herewith.

The shoe may of course be slotted at both edges instead of at one edge if the bearing is to operate in both directions.

The leveling washer 14, with its spherically curved surface of engagement 13 with the base ring 10, constitutes an equalizing means for distributing the load uniformly on the several shoes.

The chordal rib 22 although referred to as being a "knife-edge" support, need not have a true knife-edge, but may have a curved engaging surface as shown, or be otherwise suitably formed, whether of continuous or interrupted construction to provide for the proper tilting of the shoe. The terms "knife-edge" and "rib" are therefore to be construed as generic to any suitable construction providing an elongated rocking bearing for the said tilting of the shoe.

While the embodiments illustrated on the drawing have been described with considerable particularity, it is understood that the invention is not limited thereto, as the same is capable of receiving a variety of mechanical expressions, some of which will readily suggest themselves to those skilled in the art. Reference is therefore to be had to the claims hereto appended for a definition of the limits of the invention.

What I claim is:

1. A thrust bearing comprising a plurality of bearing shoes having thrust bearing surfaces, longitudinally extending knife edge supports therefor, and means for establishing automatic lubrication at said bearing surfaces.

2. A thrust bearing comprising a plurality of independent bearing shoes having thrust bearing surfaces, chordal knife edge supports therefor, and means for establishing automatic lubrication at said bearing surfaces.

3. A thrust bearing comprising a plurality of independent bearing shoes mounted to tilt in a radial direction only and provided with means for establishing automatic lubrication at the bearing surfaces.

4. A thrust bearing comprising a plurality of bearing shoes having thrust bearing surfaces, knife edge supports therefor, and beveled edges for establishing automatic lubrication at said bearing surfaces.

5. A thrust bearing comprising a thrust collar, and a plurality of bearing shoes mounted on knife edge supports and provided with beveled radial edges adapted to wedge the oil between the bearing surfaces of said collar and shoes when the bearing is in operation.

6. A thrust bearing comprising a plurality of bearing shoes having thrust bearing surfaces and longitudinally extending knife edge supports therefor, said shoes being constructed to provide automatic lubrication at said bearing surfaces.

7. A thrust bearing comprising a plurality of bearing shoes having thrust bearing surfaces, longitudinally-extending knife edge supports therefor, and beveled edges for establishing automatic lubrication at said bearing surfaces.

8. A thrust bearing comprising a plurality of independent bearing shoes having thrust bearing surfaces, longitudinally-extending knife edge supports therefor, said bearing shoes having beveled edges to provide automatic lubrication at said bearing surfaces.

9. A thrust bearing comprising relatively rotatable members, one of said members comprising a plurality of bearing shoes tiltably mounted on longitudinally-extending ribs and provided with beveled faces at their advancing edges.

10. A thrust bearing comprising relatively rotatable members having opposed bearing surfaces, one of said members comprising a plurality of bearing shoes tiltably mounted on longitudinally-extending ribs and constructed to automatically wedge the lubricating fluid between said bearing surfaces when the bearing is in operation.

11. A thrust bearing comprising relatively rotatable members having opposed bearing surfaces, one of said members comprising a plurality of bearing shoes mounted to tilt only in a radial direction and constructed to automatically wedge the lubricating fluid between said bearing surfaces when the bearing is in operation.

12. A thrust bearing comprising relatively rotatable members having opposed bearing surfaces, one of said members comprising a plurality of bearing shoes mounted to tilt only in a radial direction and provided with beveled faces at their advancing edges.

13. A thrust bearing comprising a thrust collar, a plurality of bearing shoes mounted to tilt only in a radial direction, and means to automatically wedge the lubricating fluid between the bearing surfaces of said collar and shoes when the bearing is in operation.

14. A thrust bearing comprising relatively rotatable members having opposed bearing surfaces, one of said members comprising a plurality of bearing shoes mounted to tilt only in a radial direction and constructed to automatically wedge the lubricating fluid between said bearing surfaces when the bearing is in operation, and means to equalize the pressure on said shoes.

15. A thrust bearing comprising relatively rotatable members having opposed bearing surfaces, one of said members comprising a plurality of bearing shoes mounted to tilt only in a radial direction and provided with beveled faces at their advancing edges, and an equalizing means for supporting said shoes and uniformly distributing the load thereon.

In witness whereof, I have hereunto set my hand this 12th day of November, 1917.

HARRY A. S. HOWARTH.